(12) United States Patent
Ibrahim et al.

(10) Patent No.: US 7,634,664 B2
(45) Date of Patent: Dec. 15, 2009

(54) DEVICES, SYSTEMS, AND METHODS FOR SECURE DOWNLOAD OF DATA

(75) Inventors: Wael Ibrahim, Cypress, TX (US); Steven B. Williamson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 701 days.

(21) Appl. No.: 11/058,977

(22) Filed: Feb. 15, 2005

(65) Prior Publication Data
US 2006/0184802 A1   Aug. 17, 2006

(51) Int. Cl.
G06F 11/30 (2006.01)
(52) U.S. Cl. .................. 713/189; 713/193; 713/194; 705/51
(58) Field of Classification Search .............. 713/194, 713/168, 171, 182, 200, 201, 68, 150, 189, 713/193, 175; 705/55, 51, 52, 54, 56, 57, 705/59; 380/4, 24, 25, 5, 277; 250/237; 725/31
See application file for complete search history.

(56) References Cited

U.S. PATENT DOCUMENTS

| | | | |
|---|---|---|---|
| 6,184,521 B1 * | 2/2001 | Coffin et al. ............. 250/237 R |
| 6,236,727 B1 * | 5/2001 | Ciacelli et al. ............. 380/212 |
| 6,389,538 B1 * | 5/2002 | Gruse et al. ................. 713/194 |
| 6,782,479 B1 * | 8/2004 | Williams et al. ............ 713/194 |
| 7,039,815 B1 * | 5/2006 | Grassl et al. ................ 713/194 |
| 7,124,170 B1 * | 10/2006 | Sibert ......................... 709/216 |
| 2003/0061496 A1 * | 3/2003 | Ananda ....................... 713/189 |
| 2004/0187014 A1 * | 9/2004 | Molaro ........................ 713/200 |
| 2005/0010786 A1 * | 1/2005 | Michener et al. ............ 713/185 |
| 2005/0060568 A1 * | 3/2005 | Beresnevichiene et al. .. 713/200 |
| 2005/0066355 A1 * | 3/2005 | Cromer et al. ................ 725/31 |

FOREIGN PATENT DOCUMENTS

EP    1022640 A2 *  7/2000

OTHER PUBLICATIONS

Qiong Liu, et al., "Digital Rights Management for Content Distribution", Proceedings of the Australasian Information Security Workshop Conference on ACSW frontiers 2003, vol. 21, pp. 49-58.*

Ross anderson and Markus Kuhn, "tamper Resistance: a cautionary note", USENIX Workshop on Electronic Commerce Proceedings, Nov. 18-21, 1996, pp. 1-11.*

(Continued)

*Primary Examiner*—Kieu-Oanh Bui
*Assistant Examiner*—Hee Song

(57) ABSTRACT

A secure content receiver includes a processing unit operable to request a data file from a remote device, to provide a first encryption key to the remote device, and to receive the requested data file and a key object from the remote device. The received data file is encrypted using the first encryption key. The key object imposes restrictions on the decryption of the data file. The receiver further includes a first security module that is coupled to the processing unit and that is operable to decrypt the data file according to the restrictions imposed by the key object.

41 Claims, 3 Drawing Sheets

OTHER PUBLICATIONS

Bennet Yee and J. D. Tygar, "Secure Coprocessors in Electronic Commerce Applications", In Proceedings of the 1st USENIX Workshop on Electronic Commerce, Jul. 1995, pp. 155-170.*

Joe Grand, "Practical Secure Hardware Design for Embedded Systems", http://www..grandideastudio.com/wp-admin/uploads/secure_embed_paper.pdf, Jun. 23, 2004.*

Qiong Liu et al., "Digital Rights Managemnt for Content Distribution," Proceedings of the Australasian Information Security Workshop Conference on ACSW frontiers 2003, vol. 21, pp. 49-58.*

Ross Anderson and Markus Kuhn, "Tamper Resistance: a cautionary note", USENIX Workshop on Electronic Commerce Proceedings, Nov. 18-21, 1996, pp. 1-11.*

Joe Grand, "Practical Secure Hardware Design for Embedded Systems", http://www.grandideastudio.com/wp-admin/uploads/secure_embed_paper.pdf, Jun. 23, 2004.*

Mulligan et al., "How DRM-Based Content Delivery Systems Disrupt Expectations of 'Personal Use'", ACM Workshop on Digital Rights Management, Proceedings o the 3rd ACM workshop on Digital Rights Management, Oct. 27, 2003, pp. 77-89.*

Qiong Liu et al., "Digital Rights Management for Content Distribution," Proceedings of hte Australasian Information Security Workshop Conference on ACSW frontiers 2003, vol. 21, pp. 49-58.*

Ross Anderson and Markus Kuhn, "Tamper Resistance: a cautionalry note", USENIX Workshop on Electronic Commerce Proceedings, Nov. 18-21, 1996, pp. 1-11.*

Bennet Yee and J. D. Tygar, "Secure Coprocessors in Electronic Commerce Applications," In Proceedings of hte 1st USENIX Workshop on Electronic Commerce, Jul. 1995, pp. 155-170.*

Joe Grand, "Practical Secure Hardware Design for Embedded Systems," http://www.grandideastudio.com/wp-admin/uploads/secure_embed_paper.pdf, Jun. 23, 2004.*

Bajikar, Sundeep, Trusted Platform Module (TPM) based Security on Notebook PCs—White Paper, Mobile Platforms Group, Intel Corporation, pp. 1-20, Jun. 20, 2002.

Trusted Computing Group, Backgrounder, pp. 1-8, May 2003.

* cited by examiner

DEVICES, SYSTEMS, AND METHODS FOR SECURE DOWNLOAD OF DATA

BACKGROUND

Providers of digital media content, such as music or movies, continue to search for ways to conveniently provide the content to consumers while minimizing piracy and maximizing control over use of the content. Currently, when a consumer wishes, for example, to view a movie, he typically rents or buys a digital-versatile disk (DVD), plays the DVD on a DVD player, and views the movie with a monitor, such as a television set, that is connected to the DVD player.

Some problems for the consumer associated with this approach are that the consumer must travel to obtain the DVD and, in the case of a rented DVD, return the DVD within a certain time period to avoid late-return fees. And if the consumer rents/purchases the DVD via the mail, then he must wait from a few days to a few weeks to receive the DVD. Alternatively, a consumer can subscribe to a pay-per-view service associated with a cable or satellite television hook-up. But such services typically have limited movie selections, and the consumer can typically view a selected movie only during the time(s) that the service broadcasts the movie.

A problem for the content provider is that the consumer may unlawfully copy the content either directly or indirectly. For example, the consumer may directly copy content by "burning" his own copy of a rented/purchased DVD, or by burning a DVD from a signal that carries a program that the consumer orders from a pay-per-view service. And even if a rented/purchased DVD or pay-per-view program is copy protected, the consumer may indirectly copy the content by intercepting and recording the unprotected video signal output from the DVD player to the monitor.

Similar problems exist relative to other types of digital content such as music.

SUMMARY

According to an embodiment of the invention, a secure content receiver includes a processing unit operable to request a data file from a remote device, to provide a first encryption key to the remote device, and to receive the requested data file and a key object from the remote device. The received data file is encrypted using the first encryption key. The key object imposes restrictions on the decryption of the data file. The receiver further includes a first security module that is coupled to the processing unit and that is operable to decrypt the data file according to the restrictions imposed by the key object.

Such a secure content receiver allows a consumer to download selected digital content "on demand," but in a manner that can prohibit the consumer from unlawful direct copying of the content and that can impose restrictions on the consumer's use of the content.

Furthermore, a secure content display can prohibit a consumer from unlawful indirect copying of the downloaded content.

And a system that includes both the secure receiver and secure display monitor can prohibit a consumer from both direct and indirect unlawful copying.

DETAILED DESCRIPTION

Figure 1:
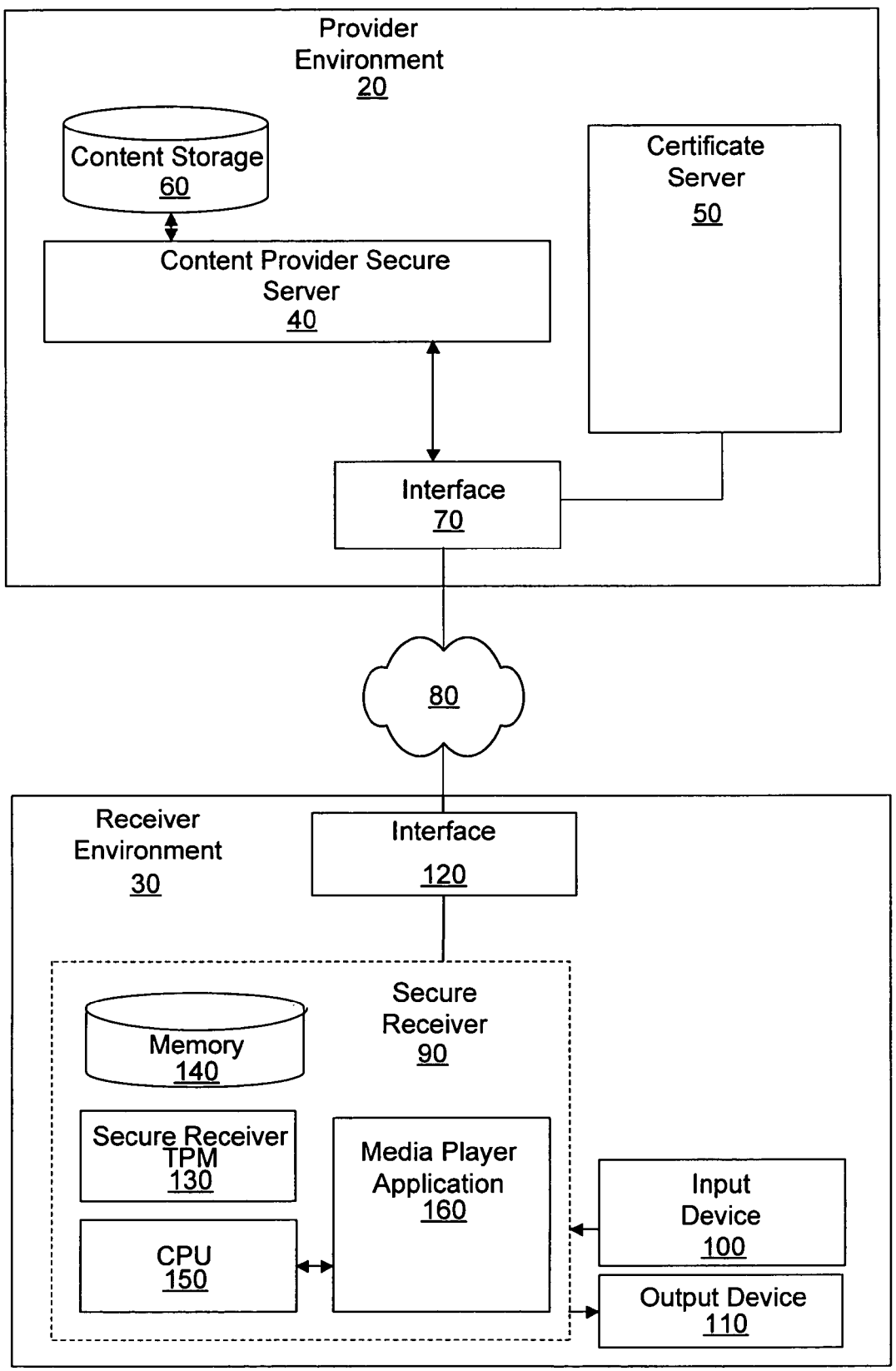
FIG. 1 is a block diagram of a secure media-file download environment that includes a content provider and a secure content-receiver device according to an embodiment of the invention.

Referring to FIG. 1, a secure-media-content download environment 10 includes a provider environment 20 and a receiver environment 30 according to an embodiment of the invention. The types of media content offered by the provider environment 20 may include video files, audio files, text files, game files, application software, and any other digital files for which secure download is desired. Some of the features of a secure download include the ability of the provider environment 20 to prohibit a consumer from copying the downloaded content in a useable form, and to otherwise prohibit the consumer from using the content in an undesired manner. For example, if the download is a movie rental, the provider environment 20 may prohibit the consumer from viewing the movie after a predetermined elapsed time, such as two days, from the download.

The provider environment 20 includes a content-provider secure server 40, a certificate server 50, a content-storage device 60, and an interface 70.

The secure server 40 retrieves a requested content file from the storage device 60 and transmits the retrieved file to the receiver environment 30 via the interface 70, such as a cable modem, digital subscriber line (DSL) connection, or other known network interface, and a wide-area network, such as the internet 80. Alternatively, the secure server 40 may retrieve the file from a remote storage device (not shown) that is accessible via the interface 70 and internet 80, or via another network (not shown) that is accessible to the provider environment 20.

And as discussed below, the secure server 40 may also encrypt the retrieved file according to one or more known encryption algorithms before transmitting the file over the internet 80. To this end, the provider environment 20 may further include a conventional encryption accelerator (not shown) to assist with file encryption.

As is also discussed below, the certificate server 50 responds to encryption-key and certification requests of the secure server 40 by producing certificates and cryptological keys that may be subsequently transmitted to the receiver environment 30 via the interface 70 and the internet 80.

Still referring to FIG. 1, the receiver environment 30 includes a secure receiver 90, an input device 100, a playing unit, such as an output device 110, and an interface 120 according to an embodiment of the invention.

The receiver 90 may be a personal computer, set-top box, or embedded system device, such as, for example, a DVD player. The receiver 90 is coupled to the input device 100, which may include, for example, a keyboard, mouse, or remote control that allows a consumer to interact with the receiver and devices, such as those associated with the provider environment 20, coupled to the receiver. The input device 100 may be coupled to the receiver 90 by a conventional wireless or physical connection, such as a USB connection. The receiver 90 is also coupled to the output device 110, which may be, for example, a television, computer monitor, and/or audio speakers, and which allows the consumer to view or hear a media file executed or "played" by the receiver. The receiver 90 receives media and other digital files, in encrypted or unencrypted format, from the provider environment 20 via the interface 120, which may be a cable modem, DSL connection, or other known network interface, and the internet 80.

The receiver 90 also includes a security module, such as a trusted platform module (TPM) 130, which, as described below, executes program instructions that cause the TPM to provide identification, validation, and decryption functions. The TPM 130 has associated therewith a unique endorsement key, which includes a public/private key pair. In addition, the TPM 130 stores an endorsement certificate that contains the public key. A purpose of the endorsement certificate is to provide to other devices, such as the provider environment 20, attestation that the associated TPM 130 is authentic (i.e., that the endorsement key associated with the TPM is protected from public access). Because TPMs, public keys, private keys, and encryption/decryption using public and private keys are known, they are not discussed here in detail. A detailed discussion of the structure and operation of the TPM 130 can be found in "Trusted Platform Module (TPM) Based Security on Notebook PCs—White Paper," Sundeep Bajikar, 2002, and "Background," Trusted Computing Group, 2003, each of which is incorporated by reference.

In addition, the receiver 90 includes a memory 140, which may include a random access memory (RAM) for storing temporary data and a read-only memory (ROM) for storing more permanent data, such as fixed code and configuration data, and a disk drive, for storing operating system and application data. For instance, depending on the performance requirements of the receiver 90, the memory 140 may store a standard or embedded operating system (OS) for the receiver 90.

Furthermore, the receiver 90 includes a central processing unit (CPU) 150, which controls the operation of the input device 100, output device 110, interface 120, TPM 130, memory 140, and other components (not shown) of the receiver and is coupled to these components via a bus (not shown). The CPU 150 exercises this control by performing logical and arithmetic operations based on program code stored within the memory device 140. Furthermore, the CPU 150 may execute a media player application 160 that causes the receiver 90 to "play" a media file such as a music file or movie file. The CPU 150 may be a conventional microprocessor, microcontroller, digital signal processor (DSP) or other such device.

Still referring to FIG. 1, the operation of the environment 10 is discussed according to an embodiment of the invention.

A consumer wishing to, for example, view a movie stored in the content storage 60 of the provider environment 20 may point a user interface, such as, for example, a browser application executed by the receiver 90, to the dynamic or static internet protocol (IP) address of the secure server 40. Alternatively, upon booting or otherwise initiating, the receiver 90 may automatically attempt to communicate with the secure server 40.

Once the receiver 90 accesses the secure server 40, the receiver may download from the secure server any needed software updates, advertisements, such as video download specials, and a menu or other listing of available media files. The server 40 may also provide to the receiver 90 an authentication certificate that identifies the server 40, and thus allows the receiver to confirm that it is communicating with the desired server. The consumer may then select, via the input device 100, the movie from the menu displayed on the output device 110 and may indicate whether he wants to rent or purchase the movie. This selection and indication are transmitted as a signal by the interface 120 of the receiver environment 30 to the interface 70 of the provider environment 20 via the internet 80.

In response to receiving the movie selection and rental/purchase indication, the secure server 40 issues a signal to the receiver 90 requesting authentication of the receiver. In response to receiving the authentication request, the TPM 130 identifies the receiver 90 to the secure server 40 as authorized to receive and play the selected movie by transmitting a copy of its endorsement certificate (which contains the TPM's public key) to the secure server.

If the consumer has chosen to rent the movie, then the secure server 40 requests the certificate server 50 to generate a key object that includes the TPM's public key and that the secure server uses to encrypt the movie file. The key object is provided to the TPM 130 along with the encrypted movie file to enable decryption of the movie file.

The key object provided by the server 40 to the TPM 130 further includes a data set (e.g., a certificate) that imposes digital-rights-management (DRM) restrictions on the consumer's right to view the movie. These restrictions may include, for example, the number of times that the movie may be viewed or a time period within which the movie may be viewed. Once the number of times is exceeded or time period expired, the data set prohibits the TPM 130 from decrypting the downloaded encrypted movie file, and thus prevents the consumer from playing the movie. Therefore, although the encrypted movie file may reside on the memory 140, it can no longer be played. The data set may further be configured to allow the consumer to burn the encrypted movie onto a DVD (not shown), where the DVD can be viewed only via a drive (not shown) of the receiver 90 and subject to the same DRM restrictions.

The data set may be configured to correspond exclusively to the endorsement certificate of the TPM 130, resulting in the consumer being unable to transfer as is the data set to another machine, and thus being unable to view the movie on any machine other than the receiver 90. Accordingly, the associated key object is said to be non-migratable (i.e., the key prevents the user from playing the movie on any machine other than the authorized receiver 90).

Alternatively, the data set may be configured to allow transfer of the data set to another machine, such that the associated key object is said to be migratable (i.e., the key allows one to transfer the movie to and play the movie on another machine that has TPM capability). A downside of a migratable key object, from the content provider's point of view, is that the movie may be viewed simultaneously on different TPM machines, thus allowing a consumer to effectively receive multiple rentals for the price of one rental. Consequently, it is contemplated that for video and other rentals, content providers will specify a non-migratable key most of the time.

The server 40 then transmits the encrypted movie file (and the key object, if not already transmitted) to the receiver 90. The TPM 130 may decrypt the movie file in real time using the key object received from the server 40 and provide the resultant decrypted data to the media player application 160 being executed by the CPU 150. The receiver 90 may further include a crypto-accelerator processor (not shown) to assist the TPM 130 with file decryption. The player application 160 generates a video signal that it provides to the output device 110, thereby allowing the consumer to view the movie. Alternatively, the receiver 90, upon receiving the encrypted movie file from the server 40, may store the encrypted movie file on the memory device 140 or other storage medium, such as a DVD, thereby allowing the consumer to decrypt (with the TPM 130) and view the movie on the device 110 at a later time, subject to the DRM restrictions imposed by the associated data set as described above.

Still referring to FIG. 1, if the consumer has chosen to purchase the movie, then the secure server 40 requests the certificate server 50 to generate a key object that allows the TPM 130 to decrypt, and thus the CPU 150 to play, the movie for an indefinite number of times over an indefinite period of time. As discussed above in conjunction with the rental procedure, the key object is typically non-migratable, thus limiting the consumer to playing the movie with the receiver 90. A first alternative is that the key object may be migratable such that the movie is playable on other TPM machines as discussed above in conjunction with the rental procedure. A second alternative is that the key object may be limited migratable. That is, using conventional copy-protection techniques, the consumer can transfer the encrypted movie file from a first TPM machine to a second TPM machine, but after the transfer, the first TPM machine can no longer play the movie. Thus, the limited migratable key object allows transfer but prohibits the simultaneous playing of the movie on multiple machines. And a third alternative is that the key object allows the receiver 90 to burn the unencrypted movie file onto a DVD such that the consumer can play the movie on any suitable TPM or non-TPM DVD player. Of course, the key object may cause the receiver 90 to employ conventional copy-protection techniques to insure that only one such DVD exists at any one time.

The server 40 then transmits the encrypted movie file (and the key object if not already transmitted) to the receiver 90. The TPM 130 may decrypt the movie file in real time using its public key and provide the resultant data to the media player application 160 running on the receiver 90. The player application 160 provides the movie to the output device 110, thereby allowing the consumer to view the movie. Alternatively, the receiver 90, upon receiving the encrypted movie file from the server 40, may store the encrypted movie on the memory device 140 or other storage medium, thereby allowing the consumer to decrypt and view the movie at a later time of the consumer's choosing according to the alternatives discussed above.

Although the above content-rental and content-purchase procedures are described for movie files, the same or similar procedures are applicable to other types of content such as music and game files, and an application that is the same or similar to the player application 160 may be used to play the content.

Figure 2:
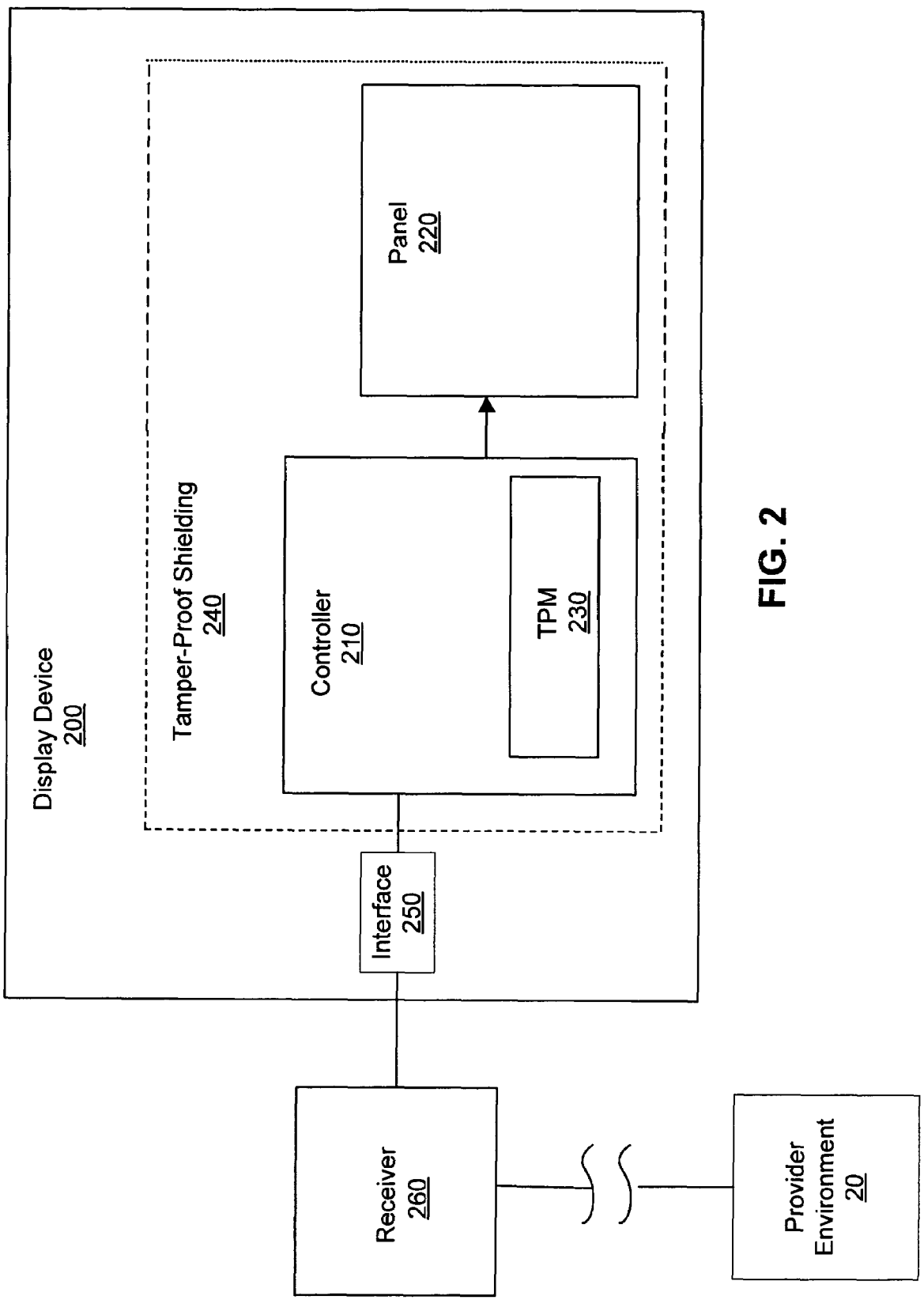
FIG. 2 is a block diagram of a secure content-display device according to an embodiment of the invention.

FIG. 2 illustrates a secure display device 200 according to an embodiment of the invention. The display device may be a television, computer or other monitor incorporating, for example, a cathode-ray tube (CRT) or liquid-crystal display (LCD), or, alternatively, may be an image projection device. While the ensuing discussion pertains to the secure configuration of a display device, it should be recognized that other presentation devices, such as, for example, stereo receivers, could be similarly configured. By requiring viewers to employ the secure display device 200, a content provider, such as the content provider 20, can better ensure that decrypted movie files are not copied to unauthorized media.

Referring back to FIG. 1, if the output device 110 cannot decode encrypted data or is not secure, a consumer may unlawfully copy decrypted content downloaded from the secure server 40 by intercepting from the receiver 90 a signal carrying the decrypted content. For example, if the output device 110 is a standard television set, then it can display only decrypted video content that is carried by a video signal from the receiver 90. Therefore, a consumer can intercept this video signal and make unauthorized copies of the decrypted video content with a recording device such as a video-cassette recorder (VCR). And even if the output device 110 can receive and decrypt encrypted content, at some point within the device there is an unencrypted display signal coupled to the display screen (not shown in FIG. 1). If a consumer can access this unencrypted display signal, then he can typically intercept it and make unauthorized copies as discussed above.

Referring back to FIG. 2, the secure display device 200 includes a controller 210 that controls the operation of the display device and is configured to provide video data for display on a playing unit, such as a display panel 220, which may be a CRT, LCD, or projector. The controller 210 may include a microprocessor, microcontroller, DSP or other device known in the art. The controller 210 also includes a TPM 230 that is similar to the TPM 130 and that is operable to store a public-key, private-key pair.

The secure display device 100 also includes tamper-proof shielding 240, which prevents access to signals, such as video and audio signals, that carry decrypted content. Specifically, the shielding 240 encloses the node or nodes (not shown) of the controller 210, the panel 220, and the corresponding conductive paths that carry such decrypted signals. Any attempt by a consumer to breach the shield 240 renders the secure display device 200 inoperable as a secure device by disabling the TPM 230 such that only an authorized service provider can re-enable the TPM 230. For example, the shielding 240 may be a light-proof, i.e., dark, enclosure. As such, the TPM 230 may be disabled by a light sensor (not shown), such as a photodiode, that is located inside the shielding 240 and that disables the TPM in response to sensing light about the shielding being breached. Alternatively, the shielding 240 may include a battery (not shown) coupled to a conventional voltage sensor (not shown) such that if the shielding is removed, the sensor disables the TPM 230 in response to the battery being disconnected from the sensor as the shielding is removed. The TPM 230 may be disabled by, for example, clearing the private key data stored in the TPM. Because the consumer does not know the private key, this clearing disables the decryption capabilities of the TPM until the private key is restored to the TPM by, for example, the TCM manufacturer or other authorized entity.

Still referring to FIG. 2, the display device 200 is coupled via an interface 250 to a receiver 260, which is similar to the receiver 90 of FIG. 1, and may be, for example, a personal computer, set-top box, or embedded-system device, such as a DVD player. Alternatively, the display device 200 and receiver 260 may be integrated into a single unit. The display device 200 allows a consumer to use the receiver 260 to securely view video files decoded by, for example, a player application (not shown) running on the receiver. The receiver 260, in turn, may be coupled to the provider environment 20 discussed with reference to FIG. 1. As discussed below, the receiver 260 may store or otherwise be configured to access the public key generated by the TPM 230.

A user of the display device 200 wishing to, for example, view a movie stored in the content storage 60 of the provider environment 20 may point a user interface executed by the receiver 260 to the internet protocol address of the secure server 40. Once the receiver 260 accesses the secure server 40, the receiver may download from the secure server any needed software updates and a menu or other listing of available media files. The user may then select the movie from the menu displayed on the display device 200. This selection is transmitted as a signal by the receiver 260 to the secure server 40.

In response to receiving the movie selection, the secure server 40 issues a signal to the receiver 260 requesting authentication of the display device 200. In response to receiving the authentication request, the receiver 260 identifies the display device 200 as authorized to display the selected movie by transmitting to the secure server 40 a key object that includes a copy of the public key associated with the TPM 230 display device 200.

Having determined that the display device 200 is authorized to receive and present the selected movie, the secure server 40 encrypts the movie file with the public key associated with the TPM 230.

The secure server 40 then transmits the encrypted movie file to the receiver 260, which, in turn, streams the encrypted movie file to the TPM 230. The TPM 230 decrypts the streamed movie file and provides a video signal to the panel 220, which displays the movie. Because all signals carrying decrypted data are rendered inaccessible by the shield 240, a consumer cannot copy the movie in an unauthorized manner.

In an alternative embodiment, having determined that the display device 200 is authorized to receive and present the selected movie, the secure server 40 requests the certificate server 50 to generate a key object that includes a key that the secure server will use to encrypt the movie file and that will be provided to the TPM 230 to enable decryption of the movie file. Furthermore, the key object may include a DRM certificate that imposes viewing/rental/purchase restrictions on the consumer's right to view the movie as discussed above in conjunction with FIG. 1.

In another alternative embodiment of the invention, the secure display device 200 is incorporated into the receiver environment 30 of FIG. 1 by coupling the secure display device to the secure receiver 90. In this embodiment, the TPMs 130 and 230 of the receiver 90 and display device 200, respectively, supply their respective public keys to the secure server 40, thereby allowing the secure server to dually encrypt a selected movie file with the public keys and provide the receiver with the dually encrypted movie file. The TPMs 130 and 230 then successively decrypt the movie file with their respective public and private keys. More specifically, the server 40 first encrypts the selected file with the public key from the display-device TPM 230 to generate a first-level encrypted file. Then the server 40 encrypts the first-level encrypted file with the public key of the receiver TPM 130 to generate a second-level encrypted file. Next, the server 40 transmits the second-level encrypted file to the receiver 90, which stores this file in the memory 140. To play the movie, the TPM 130 decrypts the second-level encrypted file, thus recovering the first-level decrypted file. As the TPM 130 decrypts the second-level encrypted file, the receiver 90 streams the recovered first-level decrypted file to the display device 200. The TPM 230 receives the streamed first-level decrypted file from the interface 250, decrypts the first-level decrypted file, and streams the decrypted video content to the panel 220, which displays the movie.

In yet another alternative embodiment of the invention, the receiver 90 of FIG. 1 and the secure display device 200 of FIG. 2 may be combined into a single device that downloads content from the provider 20. In this embodiment, the TPM 130 may be omitted from the receiver 90.

Figure 3:
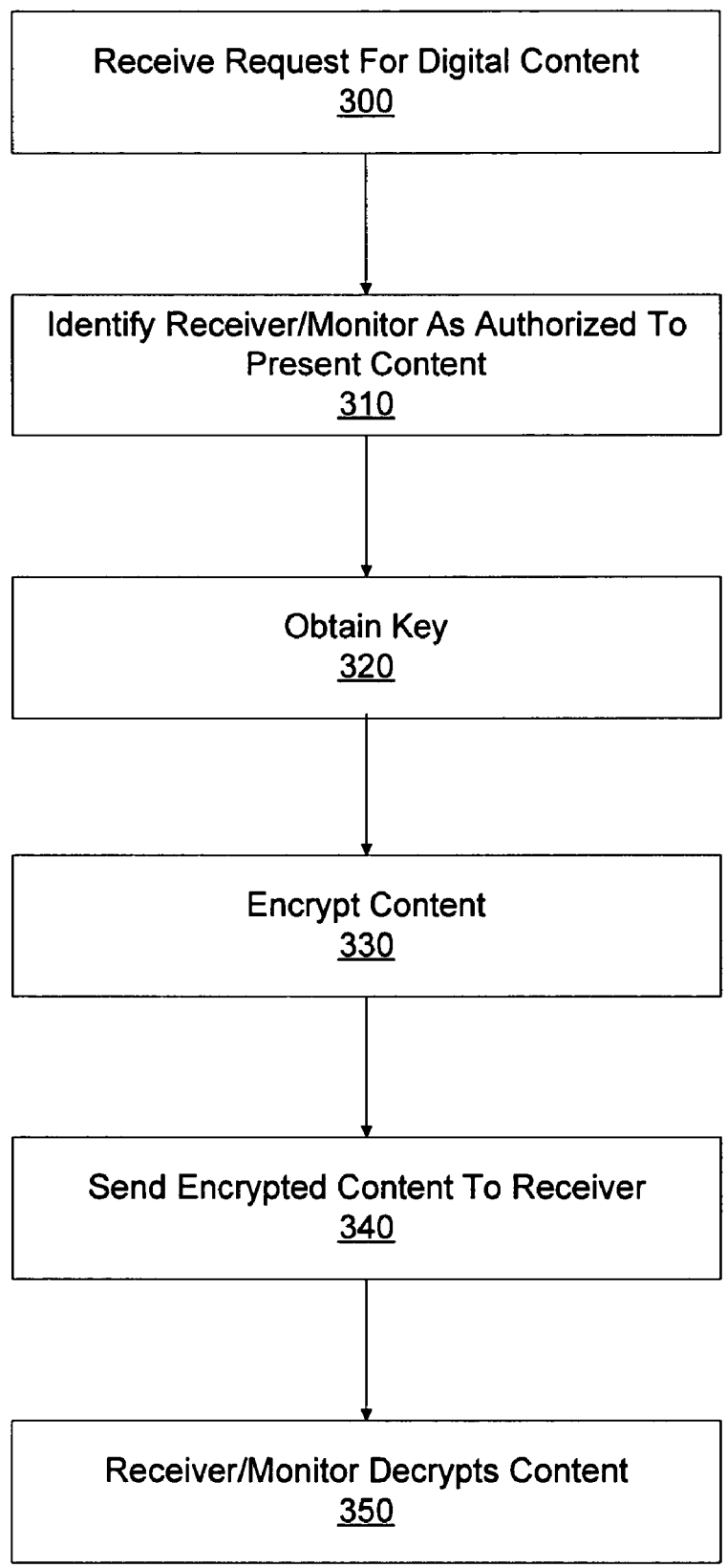
FIG. 3 is a flow chart of the secure media-file download process according to an embodiment of the invention.

Referring to FIG. 3, a flow chart of a secure media file download process according to an embodiment of the invention is shown. Referring to FIGS. 1-3, in a step 300, a consumer requests from the provider 20 digital content via a secure receiver 90 and/or secure display device 200 coupled to the internet 80. In a step 310, the secure receiver 90 and/or secure display device 200 validates to the provider 20 that the secure receiver and/or secure display device is authorized to receive and present the content. In a step 320, the provider 20 requests and obtains from the receiver 90 and/or display device 200 the respective TPM public keys. The certificate server 50 uses these public keys to generate a key object that the server 40 uses to encrypt the requested content. In a step 330, the provider 20 encrypts the digital content. In a step 340, the provider 20 transmits the encrypted content and the key object generated by the certificate server 50 to the receiver 90 and/or secure display device 200. In a step 350, the receiver 90 and/or secure display device 200 decrypts the content to allow the user to view and/or listen to the content or otherwise use the content.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A data-receiving device, comprising:
   a processing unit operable to request a data file from a remote device, to provide a first encryption key to the remote device, to receive the requested data file and a key object from the remote device, the received data file being encrypted using the first encryption key, the key object imposing restrictions on the decryption of the data file;
   a first trusted platform module (TPM) that is coupled to the processing unit and that is operable to decrypt the data file according to the restrictions imposed by the key object and to provide decrypted data to a playing unit operable to play the decrypted data; and
   a shield that protects modules coupled to the processing unit to prevent access to decrypted data, the shield encloses a light sensor, wherein if the light sensor senses light after the shield is breached, the shield clears private key data that is associated with the key object and stored in the first TPM so that the data file cannot be decrypted and the first TPM is inoperable until an authorized service provider re-enables the first TPM,
   wherein the key object is limited migratable, wherein after the data file is transferred from a first authorized receiver to a second device, the data file cannot be viewed by the first authorized receiver, preventing simultaneous playing of the data file on multiple devices.

2. The data-receiving device of claim 1 wherein the data file comprises a movie.

3. The data-receiving device of claim 1 wherein the processing unit is further operable to receive from the remote device a menu from which the data file is selected.

4. The data-receiving device of claim 1 wherein the restrictions comprise a number of times that the data file can be decrypted.

5. The data-receiving device of claim 1 wherein the restrictions comprise a time period within which the data file can be decrypted.

6. The data-receiving device of claim 1 wherein the restrictions comprise decryption of the data file only by the first TPM.

7. The data-receiving device of claim 1 wherein the restrictions comprise decryption of the data file only by one of the first TPM and a second TPM.

8. The data-receiving device of claim 1 wherein the restrictions comprise decryption of the data file by the first TPM and a second TPM.

9. The data-receiving device of claim 4 wherein the number is indefinite.

10. The data-receiving device of claim 5 wherein the time period is indefinite.

11. The data-receiving device of claim 1 wherein the shield is operable to prohibit physical access to the decrypted data if the shield is breached.

12. The data-receiving device of claim 1 wherein the first encryption key is operable to identify to the remote device that the data-receiving device is authorized to receive the data file.

13. The data-receiving device of claim 1, wherein the key object is non-migratable, wherein the data file is prevented from being viewed on any device other than an authorized receiver.

14. The data-receiving device of claim 1, wherein the shield includes a battery coupled to a voltage sensor, wherein the voltage sensor disables the first TPM in response to the battery being disconnected from the voltage sensor as the shield is removed.

15. A data-providing device, comprising:
a content server operable to receive an encryption key and a request for a data file from a first remote device, and to provide the data file, in an encrypted form, and a key object to the first remote device; and
a certificate server coupled to the content server and operable to encrypt the requested data file using the encryption key and to generate the key object, which imposes restrictions on the decryption of the encrypted data file,
wherein the first remote device contains a trusted platform module (TPM) that is operable to decrypt the data file according to the restrictions imposed by the key object and to provide decrypted data to a playing unit operable to play the decrypted data, wherein the first remote device includes a shield that protects the TPM to prevent access to decrypted data, the shield encloses a light sensor, and wherein if the light sensor senses light after the shield is breached, the shield clears private key data that is associated with the key object and stored in the TPM so that the data file cannot be decrypted and the TPM is inoperable until an authorized service provider re-enables the TPM,
wherein the key object is limited migratable, wherein after the data file is transferred from a first authorized receiver to a second device, the data file cannot be viewed by the first authorized receiver, preventing simultaneous playing of the data file on multiple devices.

16. The data-providing device of claim 15 wherein the data file comprises a movie.

17. The data-providing device of claim 15 wherein the encryption key is operable to identify to the content server that the remote device is authorized to receive the data file.

18. The data-providing device of claim 15 wherein the content server is further operable to provide to the remote device a menu from which the data file is selected.

19. The data-providing device of claim 15 wherein the restrictions comprise a number of times that the data file can be decrypted.

20. The data-providing device of claim 15 wherein the restrictions comprise a time period within which the data file can be decrypted.

21. The data-providing device of claim 15 wherein the restrictions comprise decryption of the data file only by the first remote device.

22. The data-providing device of claim 15 wherein the restrictions comprise decryption of the data file only by one of the first remote device and a second remote device.

23. The data-providing device of claim 15 wherein the restrictions comprise decryption of the data file by the first remote device and a second remote device.

24. The data-providing device of claim 19 wherein the number is indefinite.

25. The data-providing device of claim 20 wherein the time period is indefinite.

26. A system, comprising:
a content server;
a certificate server coupled to the content server and operable to encrypt a data file and to generate a key object, which imposes restrictions on the decryption of the encrypted data file;
a processing unit operable to request the data file from the content server, to provide a first encryption key to the content server, to receive the requested data file and the key object from the content server, the received data file being encrypted using the first encryption key;
a trusted platform module (TPM) coupled to the processing unit and operable to decrypt the data file according to the restrictions imposed by the key object and to provide decrypted data to a playing unit operable to play the decrypted data; and
a shield that protects modules coupled to the processing unit to prevent access to decrypted data, the shield encloses a light sensor, wherein if the light sensor senses light after the shield is breached, the shield clears private key data that is associated with the key object and stored in the TPM so that the data file cannot be decrypted and the TPM is inoperable until an authorized service provider re-enables the TPM,
wherein the key object is limited migratable, wherein after the data file is transferred from a first authorized receiver to a second device, the data file cannot be viewed by the first authorized receiver, preventing simultaneous playing of the data file on multiple devices.

27. A data-receiving-and-playing device, comprising:
a processing unit operable to request a data file from a remote device, to provide a first encryption key to the remote device, to receive the requested data file and a key object from the remote device, the received data file being encrypted using the first encryption key, the key object imposing restrictions on the decryption of the data file;
a trusted platform module (TPM) that is coupled to the processing unit and that is operable to decrypt the data file according the restrictions imposed by the key object and to generate a stream of the decrypted data;
a playing unit operable to receive and play the stream of decrypted data; and
a shield that protects modules coupled to the processing unit to prevent access to decrypted data, the shield encloses a light sensor, wherein if the light sensor senses light after the shield is breached, the shield clears private key data that is associated with the key object and stored in the TPM so that the data file cannot be decrypted and the TPM is inoperable until an authorized service provider re-enables the TPM,
wherein the key object is limited migratable, wherein after the data file is transferred from a first authorized receiver to a second device, the data file cannot be viewed by the first authorized receiver, preventing simultaneous playing of the data file on multiple devices.

28. The data-receiving-and-playing device of claim 27 wherein the shield encloses the TPM and the playing unit.

29. The data-receiving-and-playing device of claim 27 wherein the light sensor comprises a photodiode.

30. The data-receiving-and-playing device of claim 27 wherein the playing unit comprises a video display.

31. The data-receiving-and-playing device of claim 27 wherein the playing unit comprises an audio speaker.

32. A data-receiving-and-playing system, comprising:
- a processing unit operable to request a data file from a remote device, to provide a first and second encryption keys to the remote device, to receive the requested data file and a key object from the remote device, the received data file being encrypted at a first level using the first encryption key and at a second level using the second encryption key, the key object imposing restrictions on the decryption of the data file;
- a first TPM that is coupled to the processing unit and that is operable to decrypt the data file encrypted at the second level into the data file encrypted at the first level according the restrictions imposed by the key object;
- a second TPM that is coupled to the first TPM and that is operable to decrypt the data file encrypted at the first level and to generate a stream of the decrypted data;
- a playing unit coupled to the second TPM and operable to receive and play the stream of decrypted data; and
- a shield that protects modules coupled to the processing unit to prevent access to decrypted data, the shield encloses a light sensor, wherein if the light sensor senses light after the shield is breached, the shield clears private key data that is associated with the key object and stored in the second TPM so that the data file cannot be decrypted and the second TPM is inoperable until an authorized service provider re-enables the second TPM,
- wherein the key object is limited migratable, wherein after the data file is transferred from a first authorized receiver to a second device, the data file cannot be viewed by the first authorized receiver, preventing simultaneous playing of the data file on multiple devices.

33. The data-receiving-and-playing system of claim 32 wherein the data file comprises a movie.

34. The data-receiving-and-playing system of claim 32 wherein the processing unit is further operable to receive from the remote device a menu from which the data file is selected.

35. The data-receiving-and-playing system of claim 32 wherein the restrictions comprise a number of times that the data file can be decrypted.

36. The data-receiving-and-playing system of claim 32 wherein the restrictions comprise a time period within which the data file can be decrypted.

37. The data-receiving-and-playing system of claim 32 wherein the restrictions comprise decryption of the data file only by the first and second TPM.

38. The data-receiving-and-playing system of claim 35 wherein the number is indefinite.

39. The data-receiving-and-playing system of claim 36 wherein the time period is indefinite.

40. The data-receiving-and-playing system of claim 32 wherein the first encryption key is operable to identify to the remote device that data-receiving-and-playing system is authorized to receive the data file.

41. A method, comprising:
- receiving an encryption key and a request for a data file from a first remote device, the first remote device including a shield that prevent access to decrypted data, the shield encloses a light sensor and a trusted platform module (TPM);
- encrypting the requested data file using the encryption key;
- generating a key object, which imposes restrictions on the decryption of the encrypted data file; and
- providing the data file, in an encrypted form, and the key object to the first remote device, and
- if the light sensor senses light after the shield is breached, clearing private key data that is associated with the key object and stored in the TPM so that the data file cannot be decrypted and the TPM is inoperable until an authorized service provider reenables the TPM,
- wherein the key object is limited migratable, wherein after the data file is transferred from a first authorized receiver to a second device, the data file cannot be viewed by the first authorized receiver, preventing simultaneous playing of the data file on multiple devices.

* * * * *

UNITED STATES PATENT AND TRADEMARK OFFICE
CERTIFICATE OF CORRECTION

PATENT NO. : 7,634,664 B2  Page 1 of 1
APPLICATION NO. : 11/058977
DATED : December 15, 2009
INVENTOR(S) : Wael Ibrahim et al.

It is certified that error appears in the above-identified patent and that said Letters Patent is hereby corrected as shown below:

In column 10, line 52, in Claim 27, after "of" delete "the".

In column 11, line 26, in Claim 32, after "of" delete "the".

In column 12, line 30, in Claim 41, after "file;" delete "and".

In column 12, line 37, in Claim 41, delete "reenables" and insert -- re-enables --, therefor.

Signed and Sealed this

Fifteenth Day of June, 2010

David J. Kappos
*Director of the United States Patent and Trademark Office*